Feb. 20, 1945.                G. B. STILLWAGON, JR                2,369,810
                                  UNIVERSAL JOINT
                                  Filed July 8, 1942
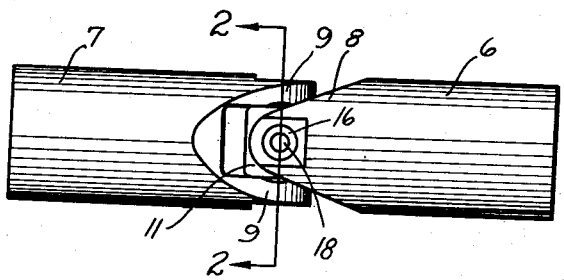
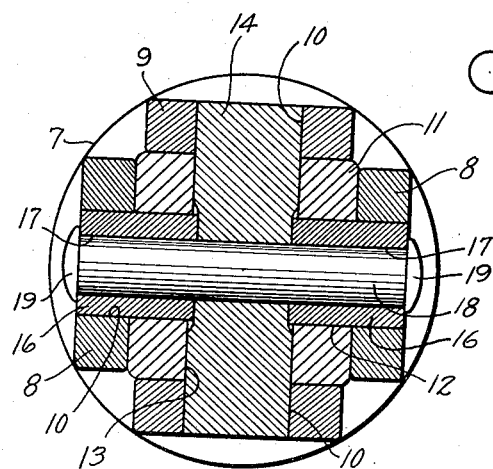
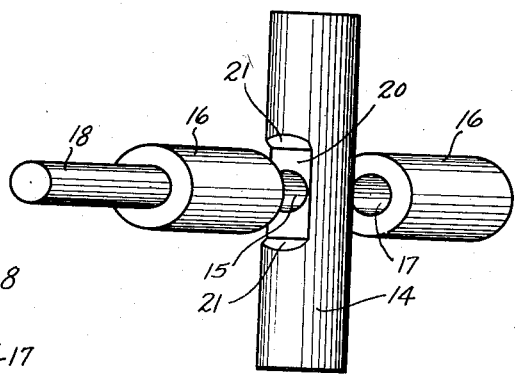
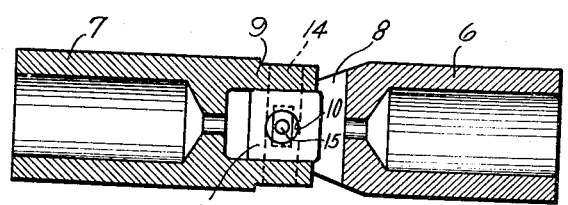
George B. Stillwagon Jr.
Inventor
By Attorney Patented Feb. 20, 1945

2,369,810

UNITED STATES PATENT OFFICE 2,369,810

UNIVERSAL JOINT

George B. Stillwagon, Jr., Dayton, Ohio, assignor of one-half to Kenneth G. Fraser, Dayton, Ohio Application July 8, 1942, Serial No. 450,160

1 Claim. (Cl. 64—17)

This invention relates to universal joints and is designed primarily for use in installations where high strength, reliability and long life are of major importance, such as on airplanes, but is not limited to such use.

The invention relates more particularly to a universal joint of the jaw type in which a single pivot pin extends through both jaws of one coupling member and separate pivot pins extend through the respective jaws of the other coupling member. In joints of this type as heretofore proposed the construction has been such as to materially weaken one or more of the elements, or to render the joint expensive to manufacture, or both.

One object of the invention is to provide such a joint in which all the elements will be of optimum strength and can be manufactured and assembled at relatively low cost.

A further object of the invention is to provide such a joint in which the pivot pins and their connecting elements will require very little machining and may be quickly and easily assembled in the joint and locked in their assembled positions.

A further object of the invention is to provide such a joint in which the bearing surfaces will be spaced from the neutral axis of the joint such a distance as to materially reduce bearing pressures and in which the pivot pins may be of equal diameters for balanced strength and wear.

A further object of the invention is to provide such a joint with a permanent pin lock of a simple inexpensive character which can be quickly and easily inserted and secured in locking position.

Other objects of the invention may appear as the invention is described in detail.

In the accompanying drawing Fig. 1 is a side elevation of the universal joint embodying my invention; Fig. 2 is a transverse section taken on the line 2—2 of Fig. 1, on a larger scale; Fig. 3 is a longitudinal section taken centrally through the coupling members of the joint of Fig. 1 and showing the connecting block in elevation with one of the short pivot pins removed; and Fig. 4 is a detail view of the pivot pins and locking member disassembled.

In the drawing I have illustrated one embodiment of my invention and have shown the same as applied to a universal joint of a known construction but it will be understood that the invention may take various forms and may be applied to joints of different kinds.

The universal joint here illustrated comprises two cylindrical coupling members 6 and 7 arranged end to end and adapted to be connected with the respective shafts which are to be coupled. The adjacent ends of the coupling members are provided with jaws 8 and 9, each member having its end slotted to provide the same with a pair of parallel jaws, the jaws of each member being in planes intersecting the planes of the jaws of the other member, and the jaws of each pair having alined bearing openings 10. Arranged between the jaws of both pairs is a connecting block 11, sometimes called a transmission member, which is provided with intersecting ports 12 and 13 in line with the bearing openings of the respective pairs of jaws.

The jaws of one pair, in the present instance the jaws 9 of the coupling member 7, are pivotally connected with the connecting block 11 by a single pivot pin 14 which extends through the bore 13 of the connecting block and through the bearing openings in the jaws 9. The pivot pin is cylindrical in form and fits snugly in the bore of the connecting block and the projecting ends thereof form journals for the jaws 9. This pin is provided with a transverse opening 15 in line with the bore 12 of the connecting block. The jaws 8 of the coupling member 6 are connected with the connecting block by separate and relatively short pivot pins 16 which extend through the bearing openings of the jaws 8 and fit into the respective end portions of the bore 12 and have their inner ends in contact with the respective sides of the pivot pin 14. Each of these short pivot pins 16 is provided with a longitudinal opening 17 in alinement with the opening 15 in the pivot pin 14. The several pivot pins are connected one with the other and locked in their assembled positions by a locking element 18 which extends through the openings in the three pivot pins and is provided at its ends with means engaging the outer ends of the short pivot pins 16 to retain the same in engagement with the pivot pin 14. This locking member is preferably in the form of an elongate rivet, the ends of which are enlarged, as shown at 19, to engage the outer ends of the respective pivot pins 16. In the present instance the rivet prior to insertion consists of a headless pin of a length sufficient to extend beyond both pivot pins 16 far enough to permit the ends thereof to be upset against the pivot pins and thereby draw the pivot pins 16 tightly against the pivot pin 14. Such a rivet is very inexpensive of production and can be quickly and accurately upset in a riveting machine to provide a rigid and permanent locking element of such a character as to inhibit loosening under vibration and to be proof against tampering.

In the preferred construction, here shown, the pivot pin 14 is provided on its opposite sides at the respective ends of the opening 15 with flat areas 20 to provide seats for the flat inner ends of the short pivot pins 16. These flat areas are of a transverse width approximating the diameter of the opening 15, thus avoiding cutting away any material part of the pivot pin 14 at 20 the sides of the opening 15, and retaining the maximum strength of the pivot pin permitted by the opening 15. It is seldom that it is desired to disassemble a joint which has once been finally assembled but in the course of the assembly of a joint it is sometimes desirable to remove one or more of the pivot pins and when these pins fit tightly in the bores of the connecting block with their outer ends flush with the outer surfaces of the jaws it is difficult to remove the same. I have therefore shown the ends of the recesses formed in the pivot pin 14 by the flat areas 20 as beveled, at 21, so that when the rivet 18 has been removed, or has not yet been inserted, a blow or blows on the end of the pivot pin 14 will force the short pivot pins 16 outwardly far enough to permit the pin 14 to be removed and to thus permit the short pivot pins 16 to be removed.

Each of the pivot pins is of cylindrical form and has flat or substantially flat ends, thus enabling the same to be ground on a centerless grinder, the shallow flats at the sides of the pivot pin 14 not interfering with the centerless grinding. Thus the pivot pins may be quickly and inexpensively formed by cutting cylindrical stock to the proper length and passing the cut sections through the grinding machine. As has been stated the rivet 18 is provided in the form of a straight pin which requires only the upsetting of the ends thereof to secure it in place. Therefore the whole pin assembly can be manufactured and assembled at a low cost. When assembled it provides a universal joint with a pin strength which fully meets the requirements of the most exacting specifications.

It is of major importance that those portions of the pivot pin 14 on opposite sides of the opening 15 and the rivet 18 should be so proportioned as to provide a properly balanced strength, with the rivet having a slightly greater strength than the pivot pin because it is subjected to greater stresses. The proportions may vary according to the qualities of the material used, but the ratio of the strength of the rivet to the strength of the side portions of the pivot pin should be accurately determined. Tests and calculations have shown that the value of this ratio may vary between .7 and 1.5 without appreciably affecting the strength of the assembled joint, but variation beyond these elements will detract from the strength of the joint. The aforesaid value of the ratio is based upon the formula:

$$\frac{2Ts\left\{\frac{R^2}{2}\left(\frac{\pi\theta}{180}-\sin(180°-\theta)\right)\right\}}{Ts\pi r^2} = \text{value between .7 and 1.5}$$

in this formula, $Ts$ represents tensile strength.
$R$ the radius of the pivot pin 14.
$r$ the radius of the rivet.
$\pi$ 3.1416
$\theta$ equals two times the angle whose cosine equals $r/R$ It will be apparent therefore that I have provided a pivot pin assembly which can be utilized in jaw type universal joints of various styles; which when assembled in the joint produce a very strong unyielding construction which cannot be tampered with, and which can be produced with a minimum of labor and material and therefore at a low cost.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

In a universal joint of the type which comprises two coupling members arranged end to end and each having at one end a pair of jaws in planes intersecting the planes of the jaws of the other member, the jaws of each pair having alined bearing openings, and a connecting block mounted between the jaws of both pairs and having intersecting bores in line with the openings in the jaws of the respective coupling members, an elongate cylindrical pivot pin extending through one of said bores in said block and through the bearing openings in the corresponding pair of jaws, said pivot pin having a relatively large transverse opening in line with the other bore of said block and having at each end of said transverse opening a flat area of a transverse width approximating the diameter of said opening, separate relatively short pivot pins extending through the openings in the other pair of jaws and fitting tightly in the corresponding ends of the last mentioned bore in said block, each of said short pivot pins being cylindrical throughout its length and having at its inner end a flat surface of a diameter equal to the diameter of said pin and in contact with the adjacent flat area of the elongate pivot pin and also having a longitudinal opening in line with and of the same diameter as the transverse opening in said elongate pivot pin, and a rivet extending through the openings in the three pivot pins, having its ends enlarged and engaging the outer ends of said short pivot pins to permanently retain the inner ends thereof in firm contact with the respective flat areas of said elongate pivot pin, the cross sectional areas of said rivet and said elongate pivot pin at their points of greatest stress being such as to provide said parts with substantially balanced optimum strength.

GEORGE B. STILLWAGON, Jr.